Dec. 13, 1966  W. WALLDORF  3,291,031
TEMPERING DEVICE FOR FLOWABLE CONFECTION MASSES
Filed May 12, 1965  2 Sheets-Sheet 1
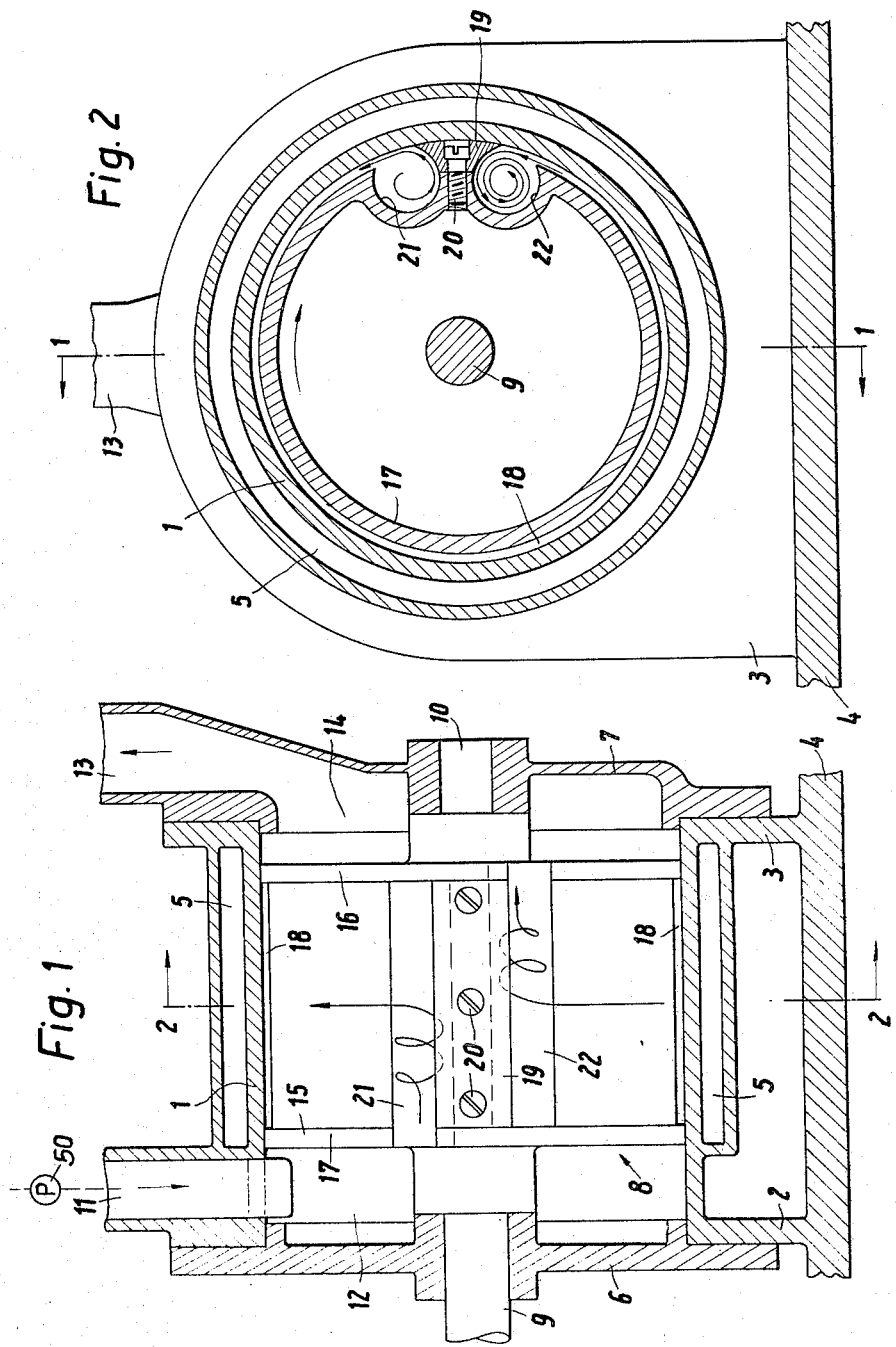
Inventor:
WERNER WALLDORF
By Hane and Nydick
ATTORNEYS Dec. 13, 1966 W. WALLDORF 3,291,031
TEMPERING DEVICE FOR FLOWABLE CONFECTION MASSES
Filed May 12, 1965 2 Sheets-Sheet 2
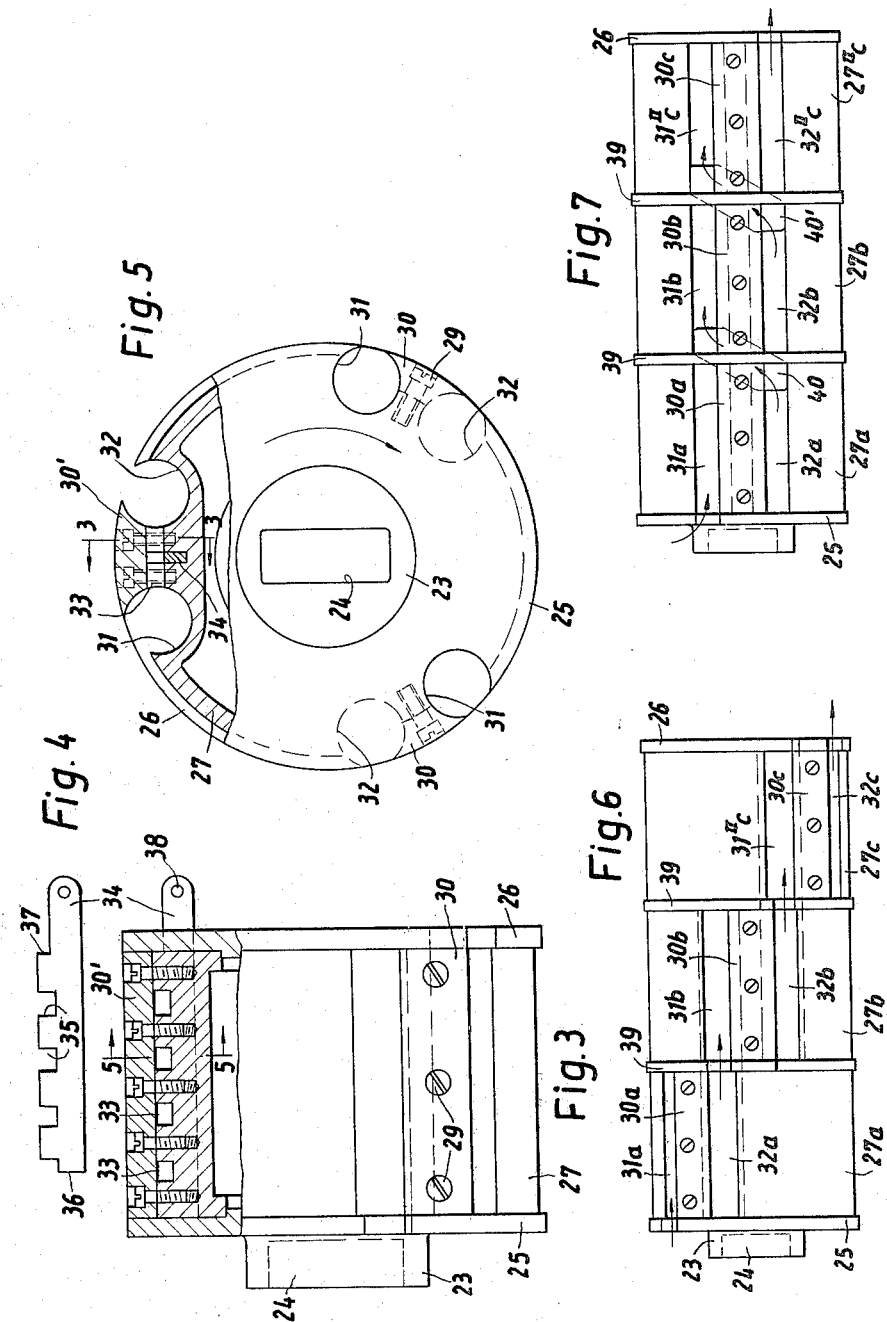
Inventor:
WERNER WALLDORF
By Hane and Nydick
ATTORNEYS United States Patent Office 3,291,031
Patented Dec. 13, 1966

3,291,031
TEMPERING DEVICE FOR FLOWABLE
CONFECTION MASSES
Werner Walldorf, Neuwied, Germany, assignor to
Richard Winkler, Neuwied, Germany, and Kurt Dunnebier, Gladbach, Germany
Filed May 12, 1965, Ser. No. 455,277
Claims priority, application Germany, July 18, 1964,
W 37,188
12 Claims. (Cl. 99—236)

The invention relates to a tempering device for tempering chocolate and similar confection masses in a flowable condition.

It is customary practice in the confection industry to temper flowable chocolate and similar confection masses, as used for coating cookies, pralines and similar items, prior to the pouring of the mass, for giving the finished product a high surface gloss and a long shelf life without graying of the coating, sometimes referred to as bloom. The purpose of the tempering is to assure that the mass of chocolate when being poured contains as large as possible a quantity of fatty crystal nuclei of the so-called "$\beta$-crystal modification," whereby it is desirable that the individual nuclei be as small as possible and be distributed as uniformly as possible throughout the mass.

Various tempering devices have been developed for the afore-pointed-out purpose.

There are known worm tempering devices in which worm conveyors rotate with little play in a cooled cylinder. Due to the cooling, a mass enriched with fatty crystals accumulates on the peripheral cylinder wall and is scraped off by the worms, whereby the large fatty crystals are broken up. However, the mixing of the scraped-off enriched marginal mass with the portion of the mass traveling deeper within the flights of the worm and thus less rich in fatty crystals is not as uniform as desired.

There are also known tempering devices in which the mass of chocolate is forced through a narrow annular slot formed between two concentric cylinders. The two cylinders move relative to each other and a scraper continuously scrapes off the material which, due to the contact with the cooled cylinder walls, thickens and is enriched with fatty crystals. The larger crystals in the scraped-off material are again broken up by the scraper action. The mass is fed through devices by means of a suitable pump disposed anteriorly of the feed inlet of the devices. The mixing and tempering devices using such narrow slot perform better than tempering devices using worms, but still are not ideal. In actual practice, the so-called "narrow slot" must have a rather considerable radial width, due to the scrapers rotating therein, as otherwise mixing could not be effected.

It is an object of the invention to provide a novel and improved device which basically employs the principle of the so-called "narrow slot" tempering devices, but is superior to devices of this kind as heretofore known, in that the mixing of the mass portion enriched with fractured fatty crystals with poorer remaining portion of the mass of chocolate or other confection material is obtained with practically complete uniformity.

The aforementioned object, feature and advantage of the invention is attained by providing in an externally cooled stationary cylinder a cylindrical roller, the outer diameter of which is such that a narrow annular slot is defined between the inner peripheral wall of the cylinder and the outer peripheral wall of the roller. This slot, which may have a radial width of about 5 mm., is axially limited at both ends by flanges of the roller which just fit the inner diameter of the cylinder. The roller mounts scraper means engaging the inner wall of the cylinder.

The scraper coacts with a suction groove which is open only in the feed direction of the mass and disposed posteriorly of the scraper means, as seen in the rotational direction of the roller, and also with the pressure groove open only in the direction of the discharge of the mass and disposed anteriorly of the scraper means.

In a device of the kind hereinbefore described, the mass to be tempered flows through the suction groove and is cooled by contact with the cool cylinder walls. As a result, fatty crystals are formed on the inner wall of the cylinder from which they are continuously scraped off by the scraper means. The scraper means and the pressure groove disposed anteriorly thereof have a coacting configuration such that the mass is scraped off in the form of layers, which roll themselves up in a manner similar to the rolling up of a web of paper. In such a stratified mass the convection gradient between the cooler and the warmer parts of the layers is very favorable. The mass moving in the narrow slot between the rotary roller and the outer cooled cylinder wall is subjected to a high frictional resistance, due to its high viscosity and as a result, the pressure in the groove anterior of the scraper means in the direction of the rotation of the roller rises sharply. Since the posterior groove is open at its end facing the feed of the mass but closed at the other end, while the anterior groove is closed at its end facing the feed of the mass and open at its other end, the device operates as a pump and transports the mass in a manner similar to that of a worm conveyor.

The roller preferably mounts several—advantageously, three—circumferentially distributed scrapers with associated grooves, which preferably have a substantially circular cross section. The scrapers and the associated grooves are preferably disposed parallel to the longitudinal axis of the roller or the cylinder. A roller assembly composed of several fixedly joined rollers in aligned relationship may be provided in the cylinder. The mixing of the mass to be tempered can be very substantially improved by disposing several rollers, for instance, five, in alignment so that, as seen from the feed end of the device, the pressure groove—that is, the anterior groove—of the first roller is in communication with the suction groove—that is, the posterior groove—of the second roller, and so forth. As is evident, the entire treatment of the mass—that is, pressing of the same through the narrow slot, cooling, scraping and layering—is repeated in each successive roller. Accordingly, the consistency and uniformity of the mass are improved from roller to roller, since each roller except the first one receives an already upgraded mass and further upgrades the same before passing it on to the next succeeding roller. Furthermore, the pressure in the mass increases with the number of rollers, which is also beneficial for the final result.

Overflow channels between the pair of grooves associated with each scraper may be provided radially beneath the scrapers, and the passage of mass through these channels preferably is controllable by means of slides which may be adjustable from the outside of the device. It is also sometimes advisable to provide a pump in the feed line for the mass. Such pump will increase the output of the device.

Extensive tests have shown that a mass tempered in a device according to the invention shows a much more uniform distribution of very minute fatty crystal nuclei in the tempered mass than is obtainable with tempering devices as heretofore known.

In the accompanying drawings several preferred embodiments of the invention are shown by way of illustration, and not by way of limitation.

In the drawing:

FIG. 1 is a cross sectional view of a tempering device according to the invention including a single roller and a single scraper, the section being taken on line 1—1 of FIG. 2 and the roller being shown in view;

FIG. 2 is a section on line 2—2 of FIG. 1;

FIG. 3 is a side view, partly in section, of a roller mounting three uniformly distributed scrapers and including overflow channels, the effective flow area of which is adjustable;

FIG. 4 is a detail view of a component of FIG. 3;

FIG. 5 is an end view of FIG. 3, partly in section and taken on line 5—5 of FIG. 3;

FIG. 6 is a plan view of a roller assembly composed of three roller elements disposed in a staggered arrangement; and FIG. 7 is a plan view similar to FIG. 6 but showing the three roller elements in aligned arrangement.

Referring now in detail to FIGS. 1 and 2, the tempering device as exemplified in these figures comprises a cylinder 1 having two end flanges 2 and 3 fixedly secured to or integral with a base plate 4. The cylinder is surrounded by a jacket 5 through which is guided a suitable coolant maintained at an automatically controlled temperature. The end faces of the jacket are closed off by two cover plates 6 and 7 which are suitably secured to the peripheral wall of the cylinder and its jacket by, for instance, screw bolts (not shown). A roller 8 is rotatably supported in the cylinder, and more specifically in the cover plates 6 and 7 thereof, by means of studs or trunnions 9 and 10. The mass of chocolate or other confection material in flowable condition is fed through an inlet duct or stud 11 into a space 12 formed between roller 8 and cover plate 6. The treated mass is discharged from the device, and more specifically from a space 14 formed therein by the respective side wall of roller 8 and cover plate 7, through a riser outlet duct or stud 13. As is indicated in FIG. 1, the feed flow is directed downwardly, and the discharge flow upwardly.

Roller 8 preferably comprises end flanges 15 and 16 and a hollow cylindrical center part 17. The two end flanges rotate in cylinder 1 without appreciable play between the outer peripheral wall of the end flanges and the inner peripheral wall of the cylinder. The outer diameter of cylindrical center part 17 is smaller, for instance, by about 10 mm. than the inner diameter of cyinder 1, whereby the radial difference between the two walls define a narrow slot 18, the radial width of which is about 5 mm.

As can best be seen in FIG. 2, the center part 17 of the roller mounts a scraper 19 which is suitably secured to the roller by, for instance, screw bolts 20 and is in contact with the inner wall of cylinder 1. The scraper extends axially across the width of cylinder part 17, and two lengthwise grooves 21 and 22 of substantially circular cross section are formed in the peripheral wall of cylindrical part 17 and extend parallel to the scraper closely adjacent thereto. Groove 21, which is posterior of the scraper as seen in the rotational direction of the roller, indicated by an arrow, constitutes a suction groove. The groove opens at one end into space 12, but is closed at the other end by end flange 16. Groove 22, which is disposed anteriorly of the scraper as seen in the rotational direction of the roller, constitutes a pressure groove. It opens at one end into space 14 and is closed at the other end by end flange 17. Roller 8 is driven by a suitable drive means in the direction of the arrow of FIG. 2, such as a drive gear (not shown) fixedly mounted on stud 9.

The tempering device as hereinbefore described operates as follows:

An untreated mass—that is, a mass prior to being tempered—is fed at a temperature of about 34° to 35° C. through inlet 11 into space 12 and flows from that space through suction groove 21 of roller 8 into narrow slot 18, and then through pressure groove 22. The viscosity of the mass while in the slot increases due to the contact with the cooler inner wall of the cylinder. Scraper 19 scrapes the mass from the cylinder wall, where the cooling of the mass is strongest and the enrichment of the mass with fatty crystals is highest. Due to the circular cross sectional configuration of groove 22, the mass when and while being scraped off forms rolled-up layers, as is indicated in FIG. 2 by arrows. The mass, which is now intimately mixed, leaves groove 22 at a temperature of 29° to 31° C. and at a considerably increased pressure. It is discharged from space 14 through the riser outlet 13.

Instead of a single scraper, as shown in FIGS. 1 and 2 to simplify the illustration of the principle of the invention, it is preferable to provide several scrapers—say, three. When three scrapers and the grooves associated therewith are used, the radial pressure within the device is substantially in balance. As a result, the roller will rotate freely within the cylinder and may be driven by a suitable dog or other coupling means on a drive shaft.

It may be desirable to increase the volume of the mass which the roller is capable of conveying, or to vary the duration of the tempering action to which the mass is subjected while maintaining constant the rotational speed of the roller. To this end, overflow ducts or channels are provided between the pressure groove and the suction groove for each scraper, and the cross sectional flow area of these channels is adjustable by a suitable slide.

Turning now to FIGS. 3 through 5, the roller shown in these figures shows end flanges 25 and 26 and a cylindrical center part 27. A hub 23 with a drive slot 24 is provided on flange 25 of the roller which is freely rotatable in the cylinder. Three scrapers 30 are mounted on the peripheral wall of roller part 27 by screw bolts 29 or other suitable fastening means. As can best be seen in FIG. 5, the three scrapers are disposed in uniform circumferential spacing. Each of the scrapers is associated with a posterior suction groove 31 and an anterior pressure groove 32, the rotational direction of the roller being indicated in FIG. 5 by an arrow. The mass to be tempered flows from the suction groove 31 of each scraper through the narrow slot formed between the peripheral wall of roller part 27 and the inner wall of the cylinder (not shown in FIGS. 3 to 5) as described hereinbefore to the pressure groove 32 of the next succeeding scraper. A roller mounting three scrapers has about three times the output capacity of a roller provided with a single scraper only.

FIGS. 3 and 5 show the aforementioned overflow ducts or channels 33 and a slide 34 for controlling the free cross sectional flow area of the channels. Slide 34 permits a complete closing and complete opening of the overflow channels and also partial opening thereof. To accommodate the slide, the scraper preferably has the shape indicated in FIG. 5 at 30' and is secured, for instance, by two rows of screw bolts. The overflow channels are shown in FIGS. 3 and 5 as being fully opened—that is, the cut-outs 35 of slide 34 are in registry with the channels 33 in center part 27 of the roller. To facilitate locating of the slide, the same has a shoulder 37 which engages end flange 26 when the slide is in the position for fully opening channels 33. When it is desired to close channels 33 completely, the slide is pushed in until its edge 36 engages end flange 25. Displacement of slide 34 can be effected by any suitable means, such as a linkage mechanism, as is used, for instance, in conventional friction disk clutches. The linkage mechanism may be extended through cover plate 7 (of FIG. 1) and be coupled to the slide by means of cross pins 38.

FIG. 6 shows a roller assembly which comprises three individual roller elements 27a, 27b and 27c, each mounting three scrapers associated with circumferentially staggered suction grooves 31a, 31b and 31c and pressure grooves 32a, 32b and 32c. The roller elements are separated by intermediate flanges 39. At the end of the roller assembly the afore-described end flanges 25 and 26 are provided. The mass to be tempered is fed into the suction groove 31a of scraper 30a and is transferred by the pressure groove 32a to the aligned suction groove 31b of scraper 30b. The pressure groove 32b of this scraper then transfers the mass to the aligned suction groove 31c of scraper 30c. The mass finally leaves the roller through pressure groove 32c of scraper 30c.

The arrangement according to FIG. 7 is similar to that of FIG. 6, except that the three scrapers 30a, 30b and 30c and the associated grooves are not circumferentially staggered, as is shown in FIG. 6, but are in axial alignment. The arrangement according to FIG. 7 is particularly advantageous when it is desired to provide overflow channels and control slides 34 therefore, as described in connection with FIGS. 3 through 5, since the arrangement of FIG. 7 requires only a single slide of suitable length for the three aligned scrapers.

To assure that the mass leaving the pressure groove 32a of scraper 30a flows into the suction groove 31b of scraper 30b and from the pressure groove 32b of scraper 30b into the suction groove 31c of scraper 30c, slanted channels 40 and 40' are provided within the roller assembly of FIG. 7. The flow path of the mass is indicated by arrows. As is apparent, the mass enters the roller assembly through suction duct 31a and leaves it through pressure duct 32c.

Instead of providing three roller elements, as is shown in FIGS. 6 and 7, a greater number of roller elements may be used, such as five or six elements. The cooling jacket 5 of cylinder 1 as shown in FIGS. 1 and 2 may be subdivided into several jackets, particularly if the cylinder is of substantial length. Such division of the cooling jacket permits maintaining different temperature zones, each of which may be equipped with an individual automatic temperature control. A roller assembly comprising several roller elements may be associated with each temperature zone.

If desired, a conveyor pump 50 of conventional design may be included in the feed line of the device, as is indicated in FIG. 1, to increase the normal output of the device.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for tempering chocolate and similar fat-containing confection masses in a flowable state, said device comprising, in combination, a cylinder, means for maintaining the peripheral wall of said cylinder at a selected cool temperature, said cylinder having an inlet conduit for the mass to be tempered at one end and an outlet for the mass at the other end, roller means rotatably mounted within said cylinder, the outer peripheral wall of said roller means defining a narrow annular slot with the inner peripheral wall of the cylinder, scraper means mounted on the peripheral wall of the roller means in coaction with the peripheral wall of the cylinder, said peripheral wall of the roller means including a suction groove extending from said scraper means to said mass inlet conduit connected thereto and a pressure groove extending from said scraper means to said mass outlet conduit connected thereto, said suction groove being disposed posteriorly of the scraper means in a predetermined rotational direction of said roller means and said pressure groove being disposed anteriorly of the scraper means in said rotational direction.

2. A device according to claim 1, wherein a peripheral flange is provided at each end of said roller means, the peripheral rims of said flanges closely fitting the inner peripheral wall of the cylinder.

3. A device according to claim 1, wherein several circumferentially spaced scraper means are mounted on said roller means, one of said suction grooves and one of said pressure grooves being provided for each of said scraper means.

4. A device according to claim 1, wherein each of said grooves has a substantially circular cross section.

5. A device according to claim 1, wherein said scraper means and said grooves extend substantially parallel to the axes of the cylinder and the roller means.

6. A device according to claim 1, wherein said roller means comprise several lengthwise aligned and fixedly joined rollers.

7. A device according to claim 6, wherein each of said rollers has mounted thereon a scraper means and includes a suction groove and a pressure groove extending from the respective scraper means to the ends of the respective rollers, each pressure groove being lengthwise aligned with the suction groove of the adjacent roller.

8. A device according to claim 1, wherein said suction groove and said pressure groove are interconnected by an overflow channel, said channel being disposed radially underneath the scraper means.

9. A device according to claim 8, wherein a slide is lengthwise displaceable in a slot of the roller means, said slide being movable in the roller means between a limit position fully opening said overflow channel and a limit position fully closing said channel.

10. A device according to claim 9, and comprising several circumferentially spaced overflow channels, said slide including several spaced-apart control apertures, one for each channel, the slide being movable between a position in which the apertures therein are in alignment with respective ones of said channels and a position in which the apertures are out of alignment with respective ones of said channels.

11. A device according to claim 1, wherein a pressure pump is included in said inlet conduit for the mass to be tempered.

12. A device according to claim 1, wherein said suction groove is open at its end facing the inlet conduit and closed at its other end and said pressure groove is open at its end facing the outlet conduit and closed at its other end.

References Cited by the Examiner
UNITED STATES PATENTS

| | | | |
|---|---|---|---|
| 1,037,545 | 9/1912 | Savy | 99—236 |
| 2,236,554 | 4/1941 | Wiemer | 99—236 |
| 2,313,705 | 3/1943 | Jack | 99—236 |
| 3,215,192 | 11/1965 | Sollich | 99—236 |
| 3,229,647 | 1/1966 | Drachenfels et al. | 99—236 |

WALTER A. SCHEEL, *Primary Examiner.*

R. W. JENKINS, *Assistant Examiner.*